US 7,415,787 B2

(12) United States Patent
Eidsmore (10) Patent No.: US 7,415,787 B2
(45) Date of Patent: Aug. 26, 2008

(54) LICENSE PLATE FRAME

(76) Inventor: Thomas Eidsmore, 1700 Granite Creek Rd., Santa Cruz, CA (US) 95085

( * ) Notice: Subject to any disclaimer, the term of this patent is extended or adjusted under 35 U.S.C. 154(b) by 89 days.

(21) Appl. No.: 11/398,356

(22) Filed: Apr. 5, 2006

(65) Prior Publication Data
US 2006/0230651 A1 Oct. 19, 2006

Related U.S. Application Data

(60) Provisional application No. 60/668,791, filed on Apr. 6, 2005.

(51) Int. Cl.
G09F 7/00 (2006.01)
(52) U.S. Cl. .............................. 40/201; 40/202; 40/712
(58) Field of Classification Search .......... 40/201–202, 40/712
See application file for complete search history.

(56) References Cited

U.S. PATENT DOCUMENTS

| | | | |
|---|---|---|---|
| 1,587,952 A * | 6/1926 | Hartman | 40/202 |
| 1,699,191 A * | 1/1929 | Holmes | 40/202 |
| 1,923,310 A * | 8/1933 | Hippold | 40/201 |
| 2,710,475 A * | 6/1955 | Salzmann | 40/202 |
| 3,187,452 A * | 6/1965 | Dotson | 40/202 |
| 3,432,954 A * | 3/1969 | Ford | 40/202 |
| 4,891,895 A | 1/1990 | DeLaquil, Jr. | |
| 5,381,618 A | 1/1995 | Singleton | |
| 5,404,664 A | 4/1995 | Brooks et al. | |
| 5,638,623 A | 6/1997 | Shuen | |
| 5,659,986 A | 8/1997 | Simmons | |
| 5,803,526 A | 9/1998 | Rohrberg | |
| 6,286,238 B1 | 9/2001 | Harrington | |
| 2003/0090797 A1 | 5/2003 | Mueller | |

FOREIGN PATENT DOCUMENTS

WO  WO 2004/101321 A1  11/2004

* cited by examiner

*Primary Examiner*—Cassandra Davis
(74) *Attorney, Agent, or Firm*—Fay Sharpe LLP (57) ABSTRACT

A license plate frame assembly for the secure installation of a license plate upon a vehicle includes a backing plate and an outer frame. The backing plate is mounted to the vehicle. The outer frame is dimensioned to receive the license plate and the backing plate therein. A locking mechanism secures the outer frame to the backing plate.

20 Claims, 9 Drawing Sheets

LICENSE PLATE FRAME

CROSS REFERENCE TO RELATED APPLICATIONS

This application claims priority from U.S. Provisional Patent Application Ser. No. 60/668,791 filed Apr. 6, 2005 and is incorporated herein by reference.

BACKGROUND OF THE INVENTION

The present invention relates to license plate frames. More particularly, the present invention pertains to a license plate frame including features such as a handle; security features for preventing a theft or unauthorized removal of a license plate from a vehicle; and features which eliminate fasteners or mounting tabs that often impede access to registration stickers or decals.

Conventionally, a license plate is attached to the rear of a vehicle, using fasteners, for example two to four fasteners, provided through spaced openings found in the license plate. The fasteners used are typically flat head screws which engage either a large structure supported by the vehicle or some accommodation on the vehicle body such as a plastic insert or threaded clip. A license plate frame can also be supported by the same fasteners which attach the license plate to the vehicle. The use of license plate frames is well known in the prior art. Whether or not a license plate frame is used, in most cases, the heads of the screws are generally exposed which invite and facilitate the theft of the license plate and/or the removal of registration stickers or decals.

Accordingly, there is a need for a license plate frame providing additional security for license plates (and/or registration stickers or decals) secured to the motor vehicle. The license plate frame must provide a full and complete view of the license plate and any associated registration sticker, tag or decal applied thereto, while at the same time securing the plate to the vehicle. The license plate frame must make it difficult to remove the license plate, thus requiring additional time for the removal of the plate without proper tools, and thus discouraging a person attempting to take the license plate. Finally, the license plate frame must be easily removable by a relatively unskilled person by means of a proper specialized tool which may be provided with the frame.

BRIEF DESCRIPTION OF THE INVENTION

In accordance with an aspect of the present invention, a license plate frame assembly for the secure installation of a license plate upon a vehicle is provided. The license plate includes a plurality of installation holes and at least one registration decal displayed thereon. The license plate frame assembly comprises a backing plate, an outer frame and a locking mechanism. The backing plate includes a plurality of attachment holes. The attachments holes are dimensioned for registry with the installation holes of the license plate. The attachment holes are dimensioned for receiving fasteners for securing the backing plate to the vehicle. The backing plate further includes at least one outwardly extending tab for pressing the license plate against an inner surface of the outer frame. The outer frame includes upper and lower cross bars. At least one of the upper and lower cross bars precludes access to the fasteners. The outerframe further includes at least one tab for engaging the at least one tab of the backing plate. The locking mechanism secures the outer frame to the backing plate.

In accordance with another aspect of the present invention, a license plate frame assembly for the secure installation of a license plate upon a vehicle comprises a backing plate, an outer frame and a locking mechanism. The backing plate is mounted to the vehicle. The outer frame is dimensioned to receive therein the license plate and the backing plate. The locking mechanism secures the outer frame to the backing plate. The locking mechanism includes a projection extending from the outer frame and a flange extending from the backing plate. The flange is secured to the projection.

In accordance with yet another aspect of the present invention, a license plate frame assembly for the secure installation of license plate upon a vehicle comprises a backing plate, an outer frame and a locking mechanism. The backing plate mounts to the vehicle. The outer frame is dimensioned for receiving the license plate and backing plate therein. The locking mechanism secures the outer frame to the backing plate. The locking mechanism includes at least one locking fastener having a threaded first portion and a second portion. The threaded potion secures the backing plate to the vehicle. The second section engages the license plate and the outer frame. A lock housing secures the second portion to the outer frame.

Accordingly, one of the benefits of the present invention resides in the ability to provide a license plate frame assembly which secures the license plate to a vehicle in a manner making the theft of the plate more difficult to achieve.

Another of the benefits of the present invention resides in the ability to provide a license plate frame assembly which precludes the easy removal of the registration decals or stickers from a license plate therein.

Yet another of the benefits of the present invention resides in the ability to provide a license plate frame assembly which covers a portion of the license plate and completely covers the registration decals or stickers, yet provides complete visibility of the plate and registration decals.

Still another of the benefits of the present invention resides in the ability to provide a license plate frame assembly which is secured to a motor vehicle by means of conventional threaded fasteners, yet prevents the easy removal of such threaded fasteners.

Still yet another of the benefits of the present invention resides to provide a license plate frame assembly which may be easily and efficiently manufactured and marketed.

A further benefit of the present invention resides in the ability to provide a license plate frame assembly which is of a durable and reliable construction.

Still other benefits and aspects of the invention will become apparent from a reading and understanding of the description of the preferred embodiments below.

BRIEF DESCRIPTION OF THE DRAWINGS

The present invention may take physical form in certain parts and arrangements of parts, preferred embodiments of which will be described in detail in this specification and illustrated in the accompanying drawings which form a part of the invention.

DETAILED DESCRIPTION OF THE INVENTION

Figure 1:
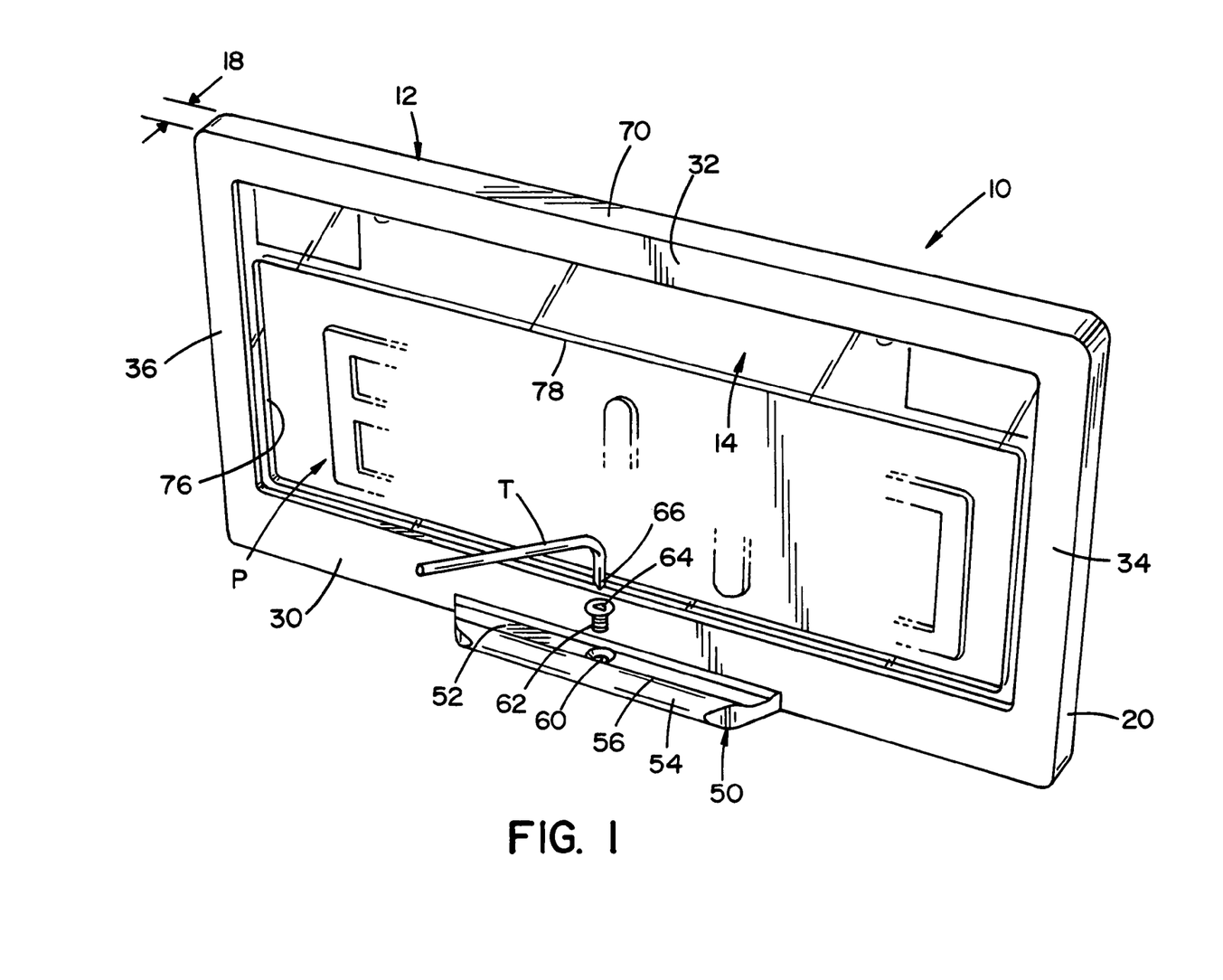
FIG. 1 is a front perspective view of a license plate frame according to a first embodiment of the present invention.
Figure 2A:
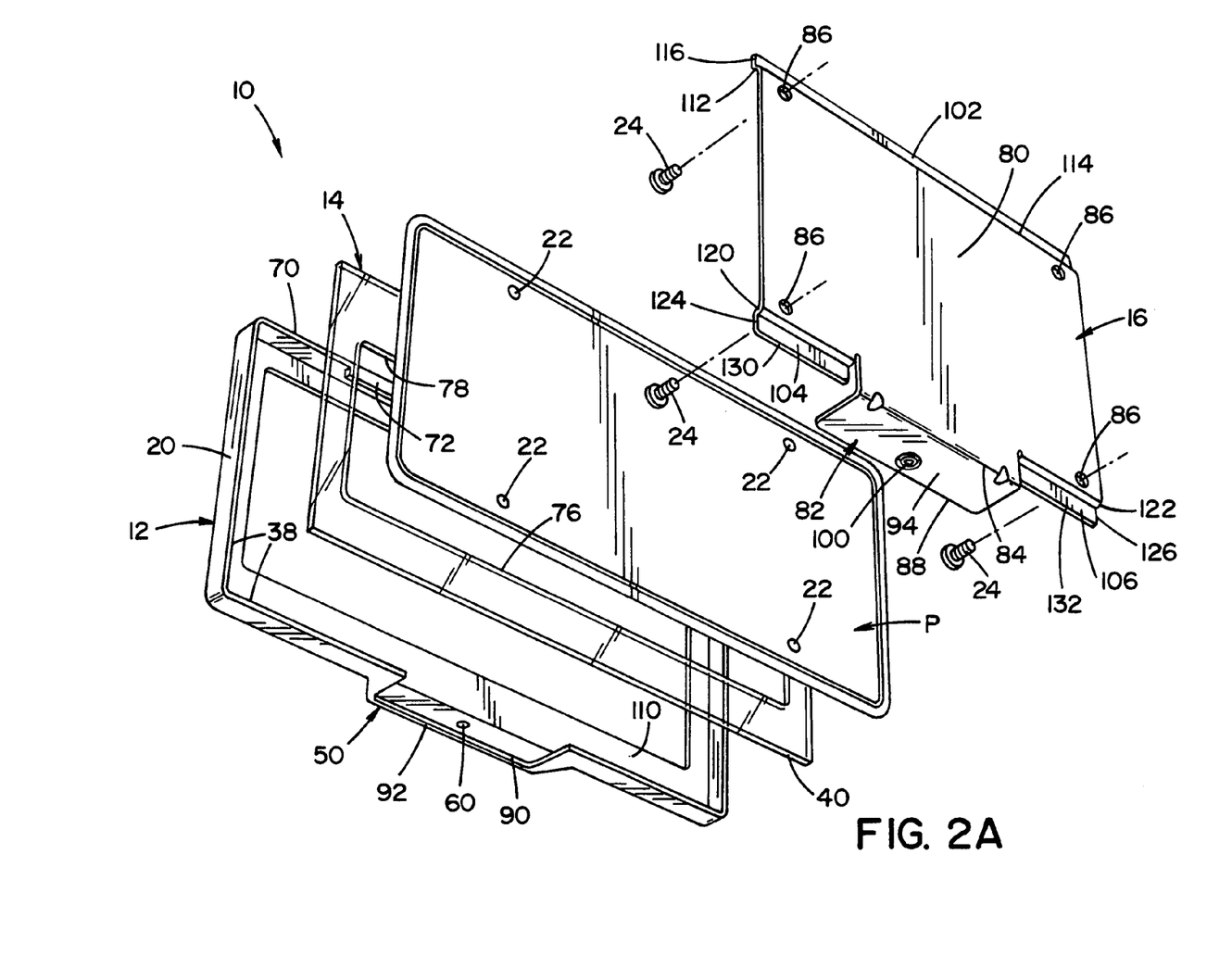
FIG. 2A is an exploded rear perspective view of the license plate frame of FIG. 1.

The description and drawings herein are merely illustrative and various modifications and changes can be made to the components and arrangement(s) of components without departing from the spirit of the invention. Like numerals refer to like parts throughout the several views. With reference to FIGS. 1 and 2A, a license plate frame 10 according to a first embodiment of the present invention is shown.

As illustrated in FIGS. 1 and 2A, the license plate frame 10 includes an outer frame 12, a transparent cover 14 and a backing plate 16. The outer frame 12 has a thickness 18 which is dimensioned to receive the transparent cover 14, a license plate P and the backing plate 16. An outer perimeter 20 of the outer frame is generally rectangular in shape and is approximately the same size as a perimeter of the license plate P, in order to fit within the confines of any area provided for the installation of the license plate on a vehicle or other surface (not shown).

The license plate P includes four spaced apart apertures 22. As will be discussed in more detail below, conventional license plate fasteners 24 extend through the backing plate 16 which allow the backing plate to be secured to either a structure supported by a vehicle or some accommodation on a vehicle body such as a plastic insert or threaded clip. As will be discussed in greater detail below, the outer frame 12 can then be positioned over the backing plate 16 and secured thereto by a single fastener. This allows the license plate frame 10 to be conveniently attached to a vehicle body without a substantial modification thereof.

The outer frame 12 includes lower and upper cross bars 30 and 32, side bars 34 and 36, and is preferably provided with an inner perimeter 38 which is slightly larger than an outer perimeter 40 of the transparent license plate cover 14. At least one of the upper and lower cross bars precludes access to the license plate bolts. In this embodiment and as shown in FIG. 1, both the lower and upper cross bars 30, 32 of the outer frame 12 shield and preclude access to the license plate bolts 24 when the license plate P is positioned in the outer frame. Thus, the frame 10 effectively precludes access to the license plate bolts 24, thereby preventing a theft or unauthorized removal of the license plate P from the vehicle. It should also be appreciated that the lower and upper cross bars 30, 32 can display indicia for advertising or other purposes.

With continued reference to FIG. 1, extending generally perpendicular to the outer frame 12 from the lower cross bar 30 is a handle 50 which is rigidly and integrally formed on the outer frame. The handle 50 provides an upper surface 52 and a lip 54 which facilitates the opening and closing of a trunk lid. The handle allows a user to close the trunk lid without placing their hands on the top surface of the trunk lid. The handle can also assist persons who are not tall enough to reach over a top of the trunk lid. The upper surface can include at least one ridge 56 which allows a user to easily grip the handle. The upper surface 52 includes an aperture 60 for receiving a locking fastener 62. The aperture 60 can be include a threaded inner surface and is dimensioned such that a head of the locking fastener will lie flush with the upper surface 52 of the handle 50.

The locking fastener threadingly engages the backing plate 16 (as will be described in greater detail below) thereby securing the backing plate and the license plate P to the outer frame 12. The locking fastener 62 includes features which are similar to conventional fasteners; however, the head of the locking fastener comprises a recess 64 which can require a specialized tool T having a configured end 66 for mating with and engaging the recess. In the present embodiment, the recess and the end of the tool have a generally triangular configuration; although, it can be appreciated that the recess and tool end can have other configurations, such as a pentagonal configuration. It should also be appreciated that the recess can have a known configuration (e.g. a hexagonal configuration) such that a conventional tool (e.g. an Allen wrench) can be used. Thus, the locking fastener, once threadingly engaged with the backing plate 16, will lie flush with the upper surface 52 of the handle 50 thereby precluding access to the locking fasteners.

With reference to FIG. 2A, extending generally normal from a top surface 70 of the outer frame 12 is at least one tab 72. While the tab is shown as being rectangular in shape, it should be appreciated that the tab can have other shapes such as an oblong shape. The tab 72 holds the transparent cover 14, the license plate P and the backing plate 16 in the outer frame. In the present embodiment, two tabs are provided; however, it can be appreciated that more or less than two tabs can be used to effectively hold the backing plate.

With reference again to FIGS. 1 and 2A, the transparent cover 14 is positioned between the outer frame 12 and the license plate P thus allowing the license plate to be observed readily, and yet preventing the removal of any dated registration decals which may be secured to the license plate. The transparent cover can include a generally rectangular opening 76 having an upper edge 78 located below the registration decals, although it can be appreciated that the opening is not critical to the features of the license plate frame 10.

The backing plate 16 includes a generally planar section 80 and a flange 82 extending generally perpendicular to a bottom edge 84 of the planar section. The planar section includes four apertures 86 which are configured to match the spacing of the standard license plate apertures 22 so that the backing plate can be attached to a vehicle or other structure. The flange 82 has an outer perimeter 88 which is dimensioned to be received within an inner perimeter 90 of a lower surface 92 of the handle 50, a bottom surface 94 of the flange lying on or slightly above a plane defined by the lower surface of the handle. The flange includes a threaded aperture 100 which corresponds with the aperture 60 of the outer frame 12. Thus, the locking fastener 62 extends through aperture 60 and threadingly engages aperture 100, an end of the locking fastener being flush with or slightly above the bottom surface 94 of the flange 82.

The backing plate 16 further includes an upper tab 102 and a pair of lower tabs 104, 106, the upper and lower tabs pressing the license plate P and the transparent cover 14 against an inner surface 110 of the outer frame 12. Particularly, the upper tab has a first portion 112 extending generally perpendicular from an upper edge 114 of the planar section 80 and a second portion 116 extending generally upward from the first portion, the second portion being engaged by the tab 72 extending from the top surface 70 of the outer frame 12. The pair of lower tabs 104, 106 have first portions 120, 122 located below the lower pair apertures 86 and extending generally perpendicular from the planar section 80 and second portions 124, 126 extending generally downward from the first portions, bottom edges 130, 132 of the second portions being located adjacent the bottom edge 84 of the planar section.

In use, the license plate frame 10 may be installed on a vehicle body by first securing the backing plate 16 to the vehicle body through a well understood use of the license plate fasteners 24. The license plate P and the transparent cover 14 are positioned in the outer frame 12 and the outer frame is fitted over the backing plate 16 and is then secured to the backing plate via the locking fastener 62 (as described above). Thus, the outer frame 12 conceals the license plate fasteners 24 and can not be easily removed without the use of the tool T. When it is necessary to remove the license plate P or the transparent cover 14 (e.g., for the installation of current registration decals), an operator simply uses the tool T to remove the locking fastener 62, thereby providing access to the license plate P and the license plate fasteners 24.

The outer frame 12 and backing plate 16 may be formed of a relatively solid, dense and durable plastic material, or alternatively formed of other materials (e.g., metals such as aluminum or steel, or other materials as desired).

Figure 2B:
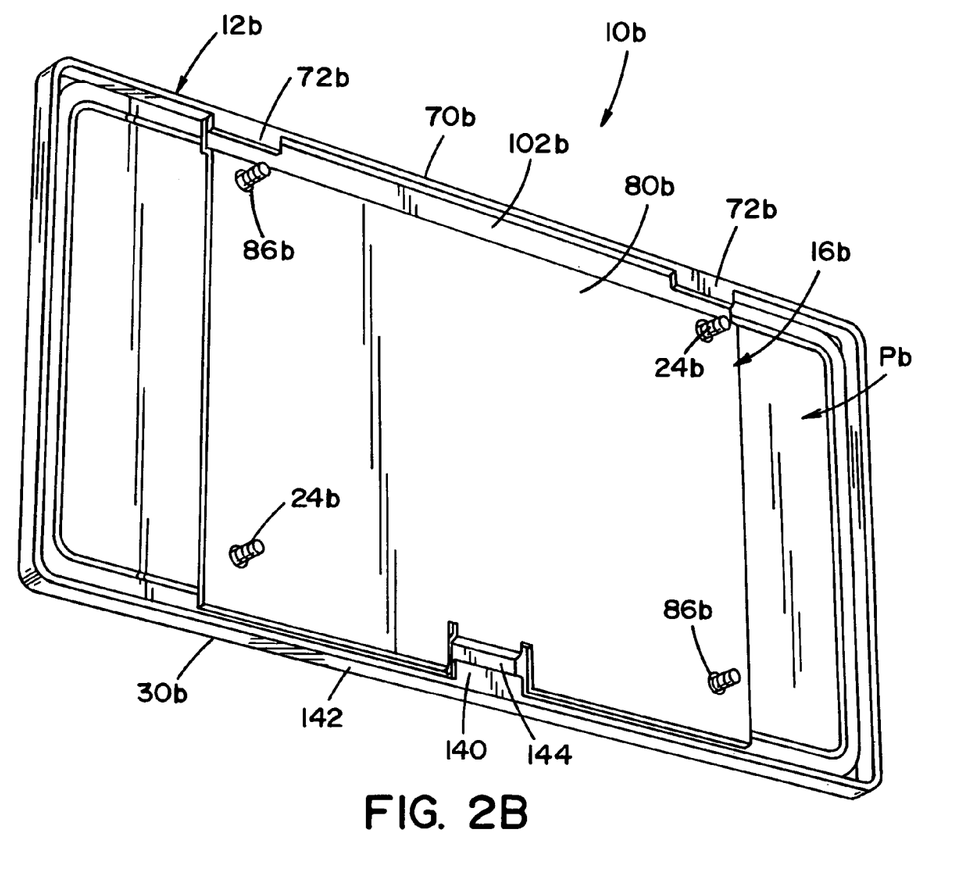
FIG. 2B is a rear perspective view of an alternate embodiment of the license plate frame of FIG. 1.

An alternative embodiment of the license plate frame is shown in FIG. 2B. Reference numerals with a letter suffix (b) refer to like components. With reference to FIG. 2B, the outer frame 12b can include a tab 140 extending generally normal from a bottom surface 142. Similar to the lower tabs 104, 106 of the backing plate 80, and in lieu of the flange 82, the backing plate 80b includes a lower tab 144. In use, the upper tab 102b of the backing plate 80b is engaged by the tab 72b extending from the top surface 70b of the outer frame 12b. The lower cross bar 30b can then be flexed or bent downward so that the lower tab 144 is engaged by the tab 140. Thus, the tabs 72b and 140 secure upper and lower portions of the license plate Pb and the backing plate 16b in the outer frame 12b. In this embodiment, one frame tab 140 and one lower tab 144 is provided; however, it can be appreciated that more than one frame tab and lower tab can be used to effectively hold the lower portion of the backing plate.

Figure 3:
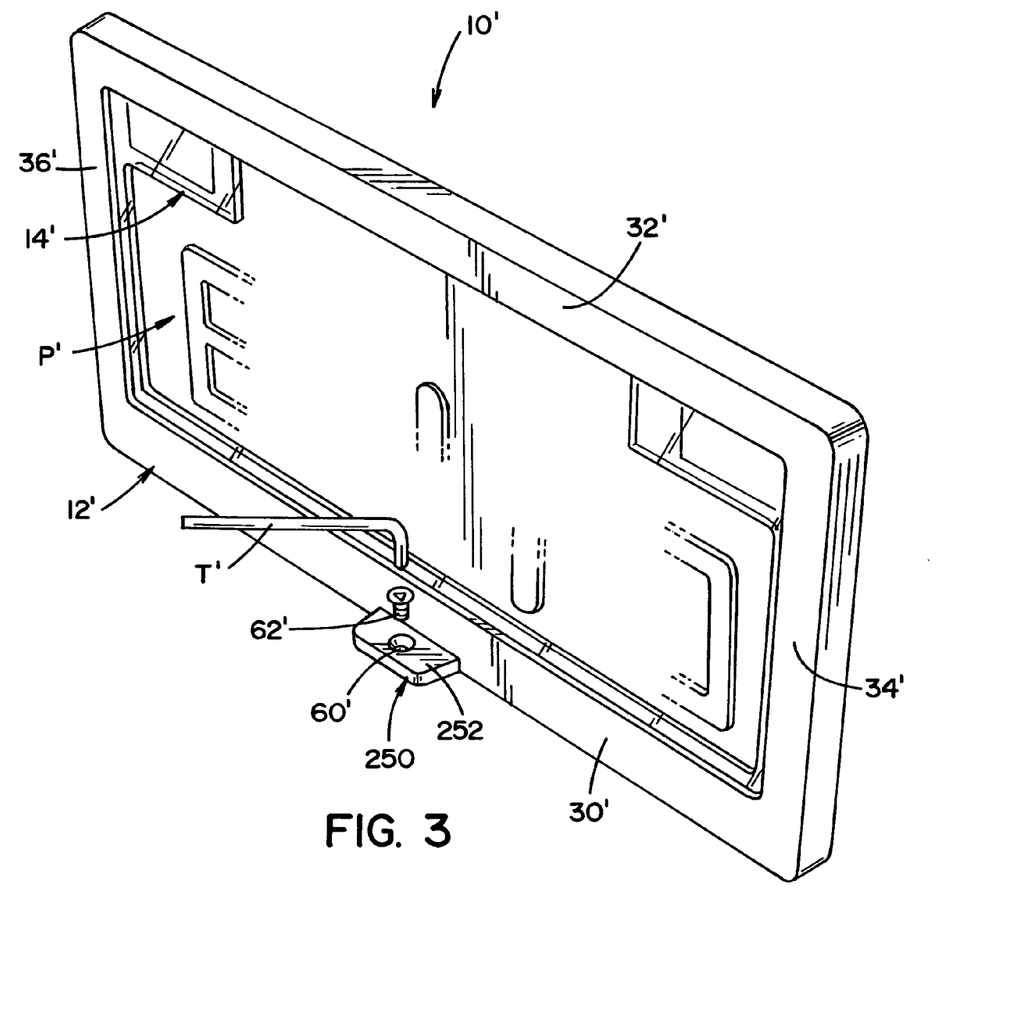
FIG. 3 is a front perspective view of a license plate frame according to a second embodiment of the present invention.
Figure 4:
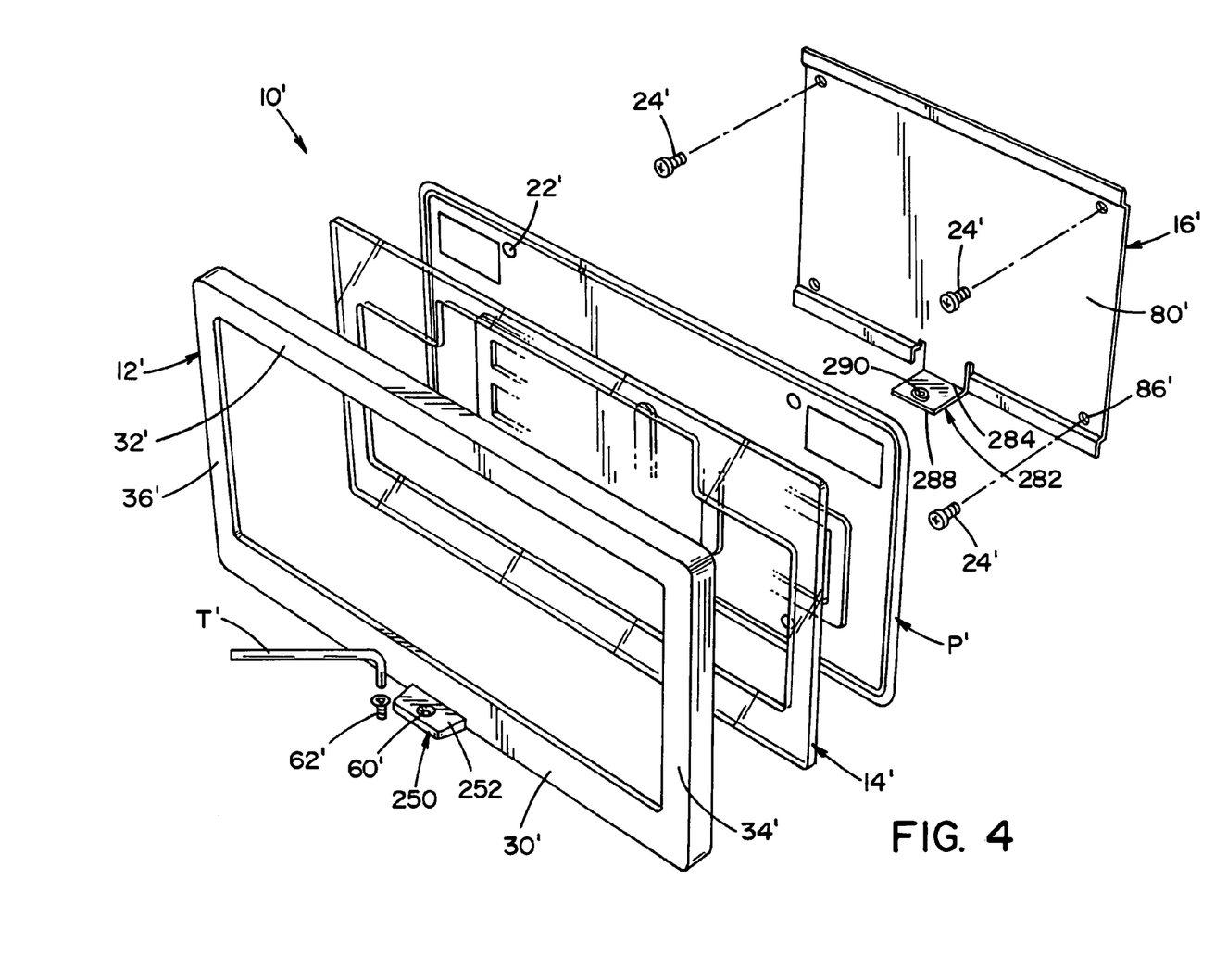
FIG. 4 is an exploded front perspective view of the license plate frame of FIG. 3.

With reference to FIGS. 3 and 4, extending generally perpendicular to the outer frame 12' from a lower cross bar 30' is a tab 250 which is rigidly and integrally formed on the outer frame. Similar to the first embodiment, the upper surface 252 includes an aperture 60' for receiving a locking fastener 62'. The aperture 60' can include a threaded inner surface and is dimensioned such that a head of the locking fastener will lie hush with the upper surface 252 of the tab 250.

With reference now to FIG. 4, the backing plate 16' includes a generally planar section 80' and a flange 282 extending generally perpendicular to a bottom edge 284 of the planar section. The flange 282 has an outer perimeter 288 which is dimensioned to be received within an inner perimeter (not shown) of a lower surface (not shown) of the tab 250. The flange includes a threaded aperture 290 which corresponds with the aperture 60' of the outer frame 12'. Thus, the locking fastener 62' extends through aperture 60' and threadingly engages aperture 290, an end of the locking fastener being flush with or slightly above a bottom surface of the flange 282.

As to a further discussion of the manner of usage and operation of the second embodiment, the same should be apparent from the above description relative to the first embodiment. Accordingly, no further discussion relating to the manner of usage and operation will be provided.

Similar to the first and second embodiments, an additional embodiment of the license plate frame is shown in FIGS. 5 through 8. Since most of the structure and function is substantially identical, reference numerals with a double primed suffix (") refer to like components (e.g., outer frame is referred to by reference numeral 12"), and new numerals identify new components in the additional embodiment of FIGS. 5 through 8. The primary distinctions relate to the means for securing the outer frame 12" to the backing plate 16".

Figure 5:
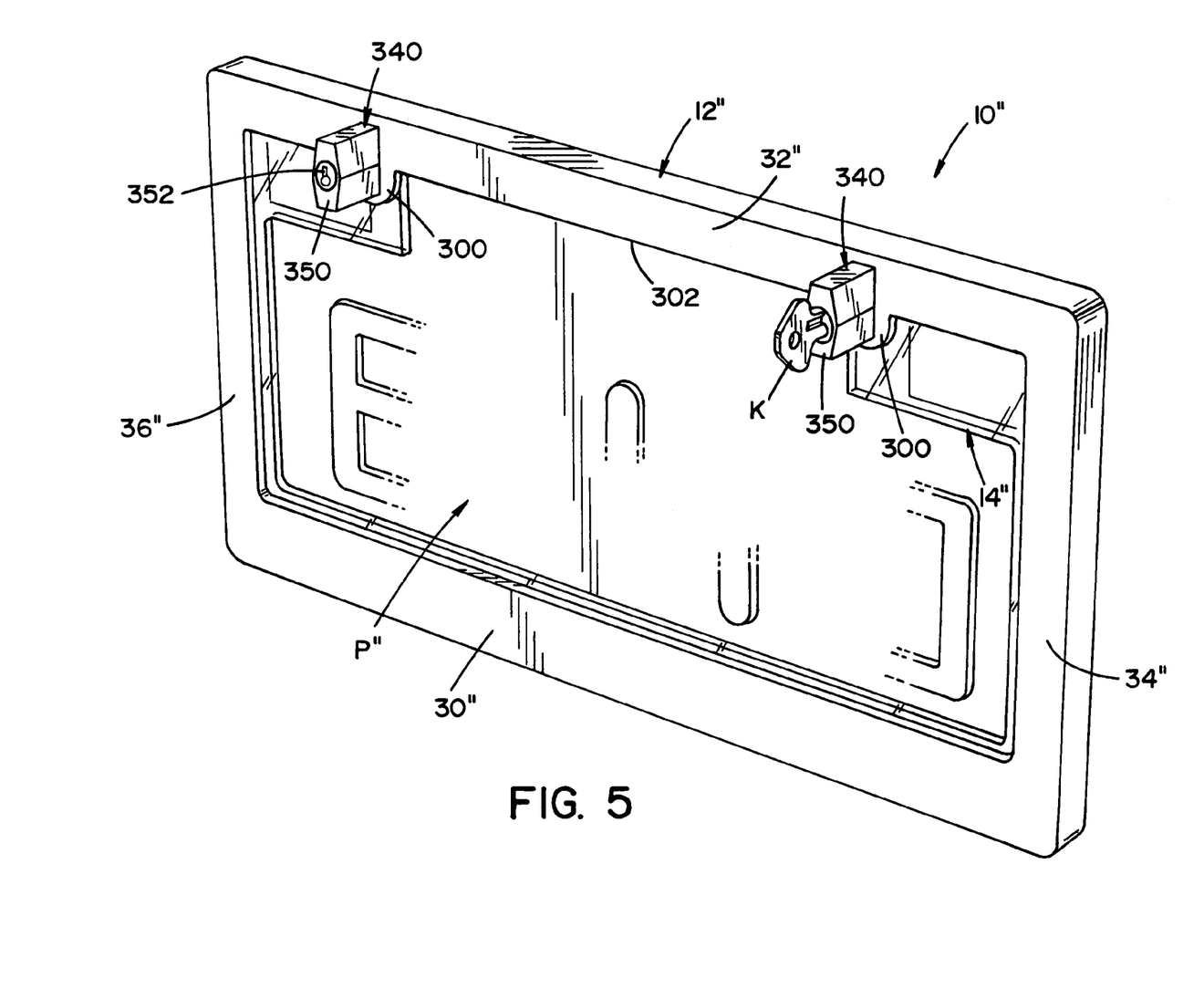
FIG. 5 is a front perspective view of a license plate frame according to a third embodiment of the present invention.
Figure 6:
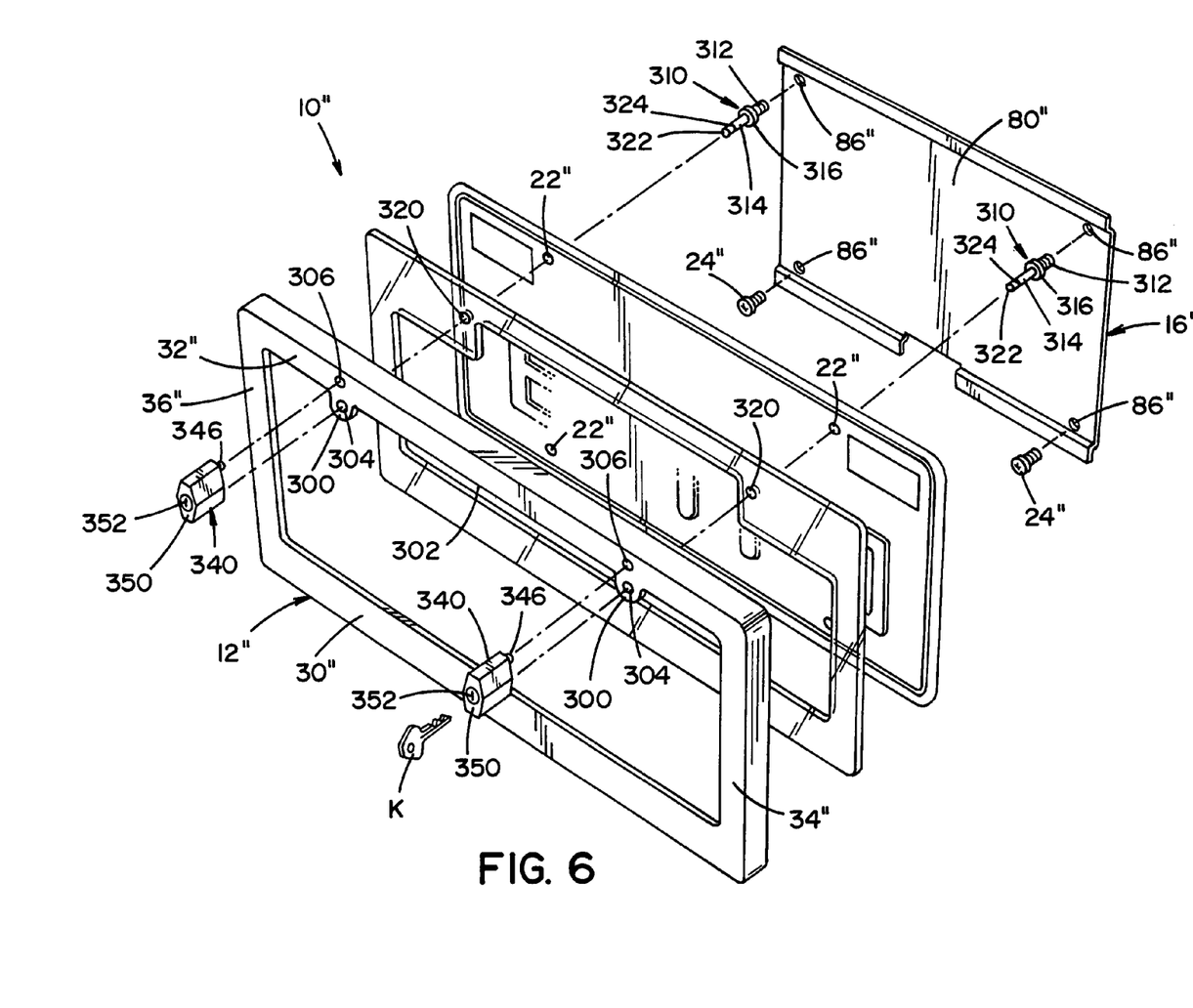
FIG. 6 is an exploded front perspective view of the license plate frame of FIG. 5.

With reference to FIGS. 5 and 6, extending generally perpendicular to the outer frame 12" from an upper cross bar 32" are a pair of tabs 300 which are rigidly and integrally formed on the outer frame. Each tab extends downward from a bottom edge 302 of the upper cross bar and includes a generally rounded end portion. However, it should be appreciated that the tabs can have other contours such a rectangular contour. Each tab includes an aperture 304, the tabs and apertures being configured to match the spacing of the standard license plate apertures 22". The upper cross bar 32" further includes a pair of openings 306, each opening being spaced from each aperture 304.

As described above, the backing plate 16" includes four spaced apart apertures 86" which allow the backing plate to be secured to a vehicle or other structure by conventional license plate fasteners 24" which extend through the backing plate 16". With reference to FIG. 6, only two such fasteners 24" are used to secure a bottom portion of the backing plate 16". To secure a top portion of the backing plate, a pair of rivet-like fasteners 310 are used. The rivet-like fasteners 310 include a threaded first portion 312, a second portion 314 and a flange 316 which separates the threaded first portion and the second portion. Each threaded portion 312 extends through an upper aperture 86" of the backing plate 16" and engages either the vehicle or other structure. As the rivet-like fastener is being engaged, the flange 316, which has an outer dimension larger than the diameter of the aperture 86", is pressed against the planar section 80" which secures the top portion of the backing plate 16".

Figure 7:
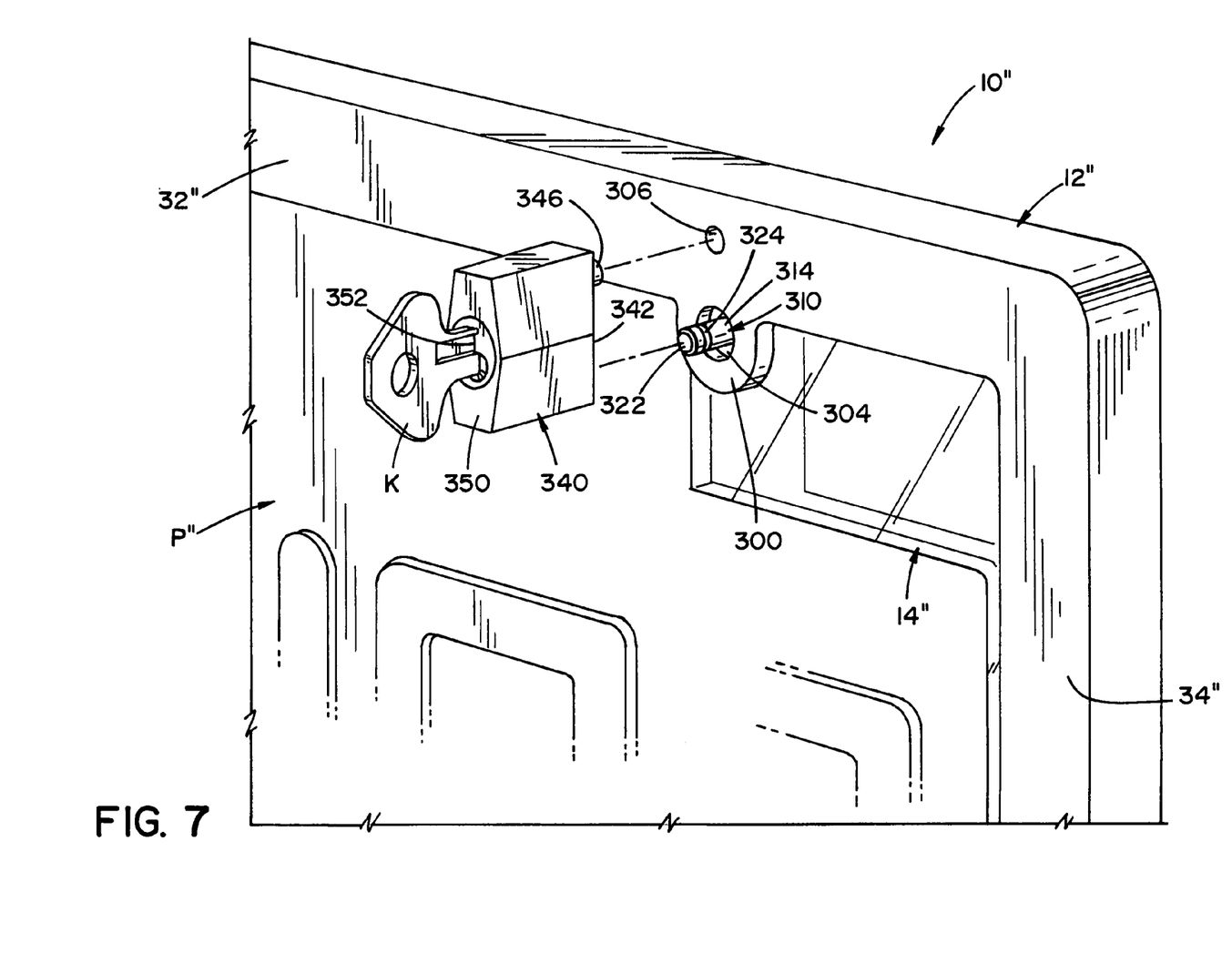
FIG. 7 is an enlarged partial front perspective view of the license plate frame of FIG. 5.

The second portions 314 of the rivet-like fasteners 310 are dimensioned to extend through the upper apertures 24" of the license plate P", a pair of openings 320 located in an upper portion of the transparent cover 14", and the apertures 304 of the tabs 300. As shown in FIG. 7, an end portion 322 of the second portion 314 projects through the aperture 304. Each end portion 322 includes a recess 324 extending around a perimeter of the second portion 314, the recess engaging a locking mechanism (not shown) housed in a padlock 340.

Figure 8:
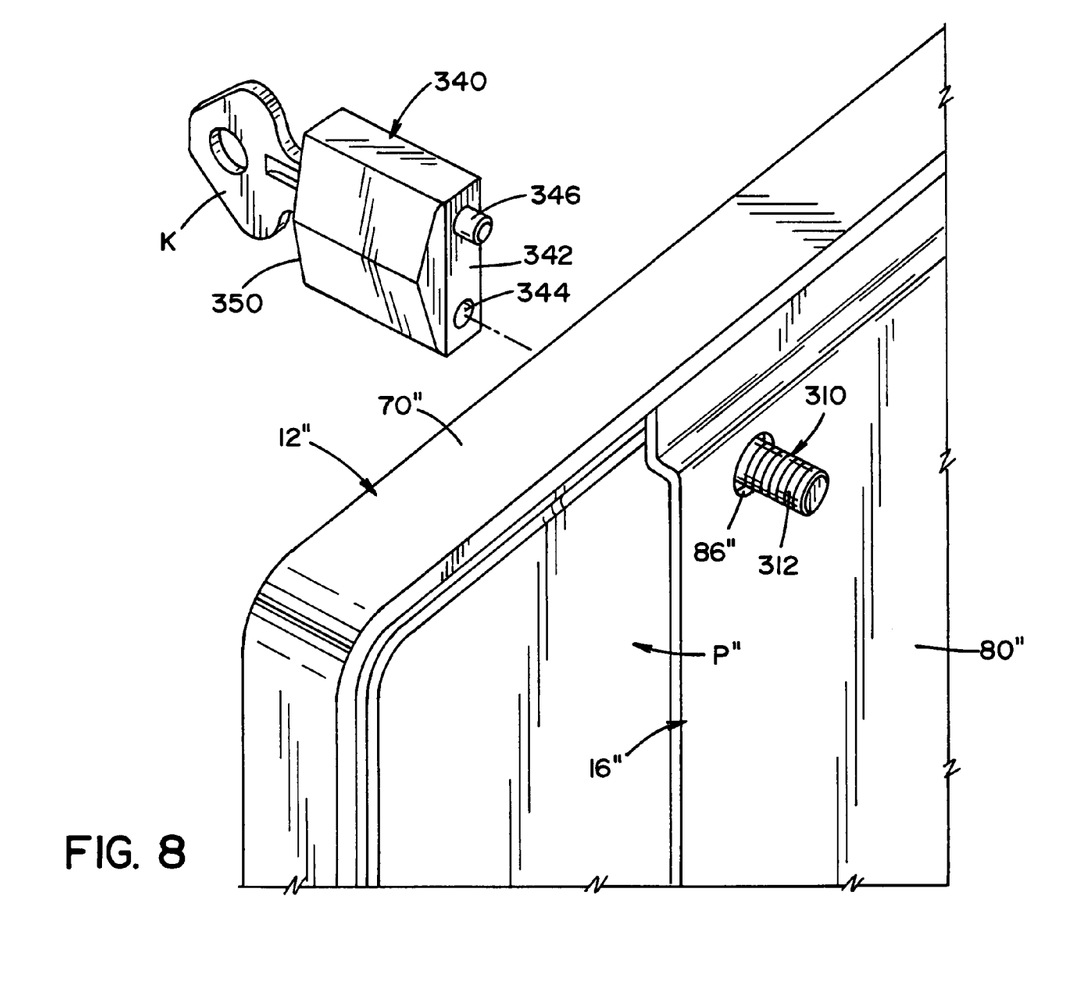
FIG. 8 is an enlarged partial rear perspective view of the license plate frame of FIG. 5.

With reference to FIGS. 7 and 8, the padlock 340 includes a first generally planar surface 342 having an opening 344 and a projection 346. The opening is dimensioned to receive the end portion 322 of the second portion 314 of the rivet-like fastener 310. The projection is dimensioned to be received in the opening 306 of the upper cross bar 32". The padlock further includes a second generally planar surface 350 having a keyhole 352 and a keyway (not shown) extending from the keyhole. It should be appreciated, however, that the second surface 350 can have other contours such a rounded contour. The keyhole and the keyway are dimensioned to receive a key K.

To secured the padlock 340 to the outer frame 12, the end portion 322 of the rivet-like fastener 310 is inserted into the opening 344 and the projection 346 is inserted into the opening 306. The key K is then inserted into the keyhole and keyway. The key is rotated which activates the locking mechanism, the locking mechanism engaging the recess 324 thereby securing the second portion 314 of the rivet-like fastener 310 in the opening 344 of the padlock 340.

In use, the license plate frame 10" may be installed on a vehicle body by first securing the backing plate 16" to a vehicle body through a well understood use of the license plate fasteners 24" and the rivet-like fasteners 310. The license plate P" and the transparent cover 14" are positioned in the outer frame 12" and the outer frame is then secured to the backing plate via the padlock 340 (as described above). Thus, the outer frame 12" can not be easily removed without the use of the key K. When it is necessary to remove the license plate P" or the transparent cover 14" (e.g., for the installation of current registration decals), an operator simply uses the key K to remove the padlock 340, thereby providing access to the license plate P" and the fasteners 24" and 310.

In an alternative embodiment (not shown), the projections 346 of the padlocks 340 include a threaded outer surface and the pair of openings 306 of the upper cross bar 32" includes a mating thread such that the padlocks 340 are threadedly secured to the upper cross bar. In another alternative embodiment (not shown), in lieu of the projections 346, each padlock 340 includes a threaded hole. Conventional fasteners extend through each opening 306 and threadedly engage the threaded holes of the padlocks 340 thereby securing the padlocks to the upper cross bar 32". In yet another alternative embodiment (not shown), the padlocks 340 are integrally formed with the outer frame 12".

The present invention have been described with reference to the preferred embodiments. Obviously, modifications and alterations will occur to others upon reading and understanding the preceding detailed description. For example, the license plate frame may not include the transparent cover thereby allowing access to the registration stickers or decals while still preventing access the license plate bolts when the license plate is positioned in the outer frame. It is intended that the present invention be construed as including all such modifications and alterations insofar as they come within the scope of the appended claims or the equivalents thereof.

What is claimed is:

1. A license plate frame assembly for the secure installation of an associated license plate upon an associated vehicle, the associated license plate including a plurality of installation holes and at least one registration decal displayed thereon, said license plate frame assembly comprising:
   a backing plate including:
      a plurality of attachment holes, said attachments holes dimensioned for registry with the installation holes of the associated license plate, said attachment holes dimensioned for receiving associated fasteners for securing said backing plate to the associated vehicle, and
      at least one outwardly extending tab for pressing the associated license plate against an inner surface of an outer frame;
   said outer frame including:
      upper and lower cross bars, at least one of the upper and lower cross bars precluding access to the associated fasteners, and
      at least one tab for engaging said at least one tab of said backing plate; and
   a locking mechanism for securing said outer frame to said backing plate.

2. The license plate frame assembly of claim 1, further comprising a transparent cover positioned between said outer frame and the associated license plate, said transparent cover preventing removal of the at least one dated registration decal displayed on the associated license plate.

3. The license plate frame assembly of claim 1, wherein said locking mechanism includes:
   a projection extending from said outer frame;
   a flange extending from said backing plate, said flange being secured to said projection thereby securing said outer frame to said backing plate.

4. The license plate frame assembly of claim 3, wherein said flange has an outer perimeter dimensioned to be received within an inner perimeter of said projection.

5. The license plate frame assembly of claim 3, wherein said projection includes a first aperture and said flange includes a second threaded aperture,
   wherein, in an assembled position, said first aperture aligns with said second aperture, each aperture being adapted to receive a locking fastener which extends through said first aperture and threadingly engages said second aperture.

6. The license plate frame assembly of claim 3, wherein said projection is a handle having at least one gripping surface.

7. The license plate frame assembly of claim 1, wherein said locking mechanism includes at least one second tab extending from said outer frame, said at least one second tab engaging at least one second tab extending outwardly from said backing plate.

8. The license plate frame assembly of claim 1, wherein said locking mechanism includes at least one locking fastener including a threaded first portion, a second portion and a flange separating said threaded first portion and said second portion,
   wherein said threaded portion extends through said attachment hole of said backing plate and engages the associated vehicle; said flange presses against said backing plate; and said second portion extends through the installation hole of the associated license plate and a first aperture located on said outer frame.

9. The license plate frame assembly of claim 8, wherein said locking mechanism includes a lock housing having an opening for receiving securing therein said second portion of said locking fastener.

10. The license plate frame assembly of claim 9, wherein said lock housing includes a projection, said projection being dimensioned to be received in a second aperture located on said outer frame.

11. The license plate frame assembly of claim 10, wherein said projection threadingly engages said second aperture.

12. A license plate frame assembly for the secure installation of an associated license plate upon an associated vehicle, said license plate frame assembly comprising:
   a backing plate for mounting to the associated vehicle;
   a outer frame dimensioned to receive therein the associated license plate and said backing plate; and
   a locking mechanism for securing said outer frame to said backing plate, said locking mechanism including:
      a projection extending from said outer frame, and
      a flange extending from said backing plate, said flange being secured to said projection.

13. The license plate frame assembly of claim 12, wherein said flange has an outer perimeter dimensioned to be received within an inner perimeter of said projection, a bottom surface of said flange being generally contiguous with a bottom surface of said projection.

14. The license plate frame assembly of claim 12, wherein said projection includes a first aperture and said flange includes a second threaded aperture,
   wherein, in an assembled position, said first aperture aligns with said second aperture, each aperture being adapted to receive a locking fastener which extends through said first aperture and threadingly engages said second aperture.

15. The license plate frame assembly of claim 12, wherein said projection is a handle having at least one gripping surface.

16. A license plate frame assembly for the secure installation of an associated license plate upon an associated vehicle, said license plate frame assembly comprising:
   a backing plate for mounting to the associated vehicle;
   a outer frame dimensioned for receiving the associated license plate and said backing plate therein; and
   a locking mechanism for securing said outer frame to said backing plate, said locking mechanism including:
      at least one locking fastener having a threaded first portion and a second portion, wherein said threaded potion secures said backing plate to the associated vehicle, wherein said second section engages the associated license plate and said outer frame, and
      a lock housing for securing said second portion to said outer frame.

17. The license plate frame assembly of claim 16, wherein said second portion of said locking fastener extends through an installation hole of the associated license plate and a first aperture located on said outer frame.

18. The license plate frame assembly of claim 16, wherein said lock housing includes an opening for receiving securing therein said second portion of said locking fastener.

19. The license plate frame assembly of claim 16, wherein said lock housing includes a projection, said projection being dimensioned to be received in a second aperture located on said outer frame.

20. The license plate frame assembly of claim 19 wherein said projection threadingly engages said second aperture.

* * * * *